(No Model.) 2 Sheets—Sheet 2.
J. KNICKERBACKER.
VALVE.
No. 584,940. Patented June 22, 1897.
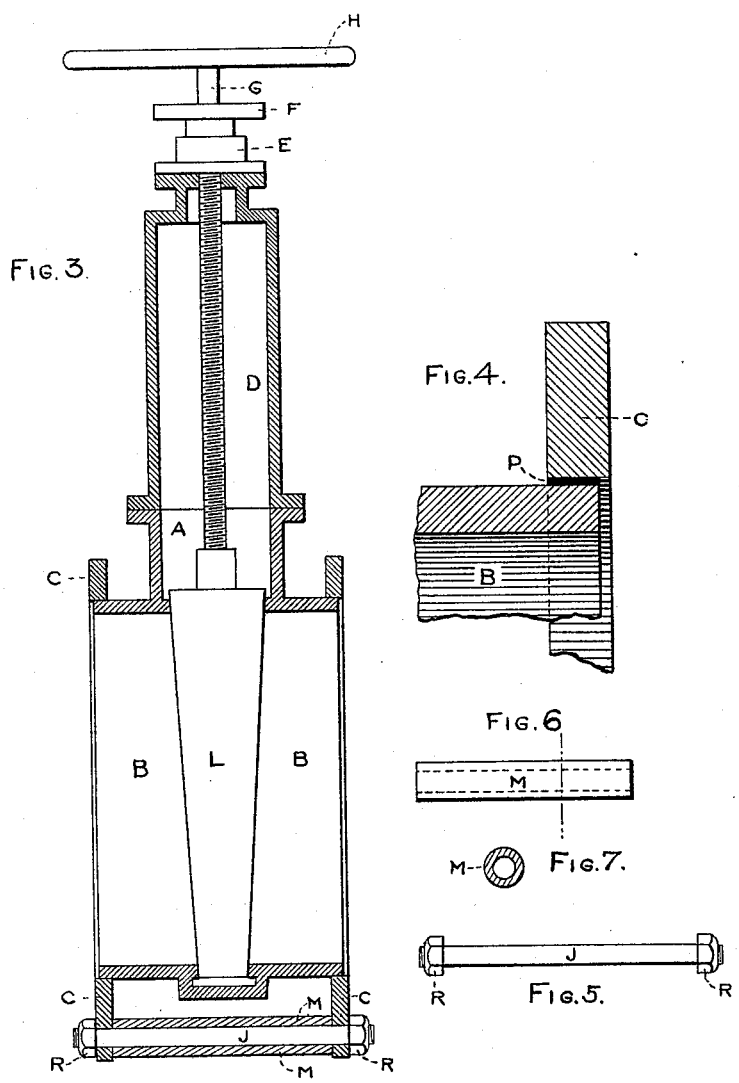
WITNESSES:
INVENTOR.

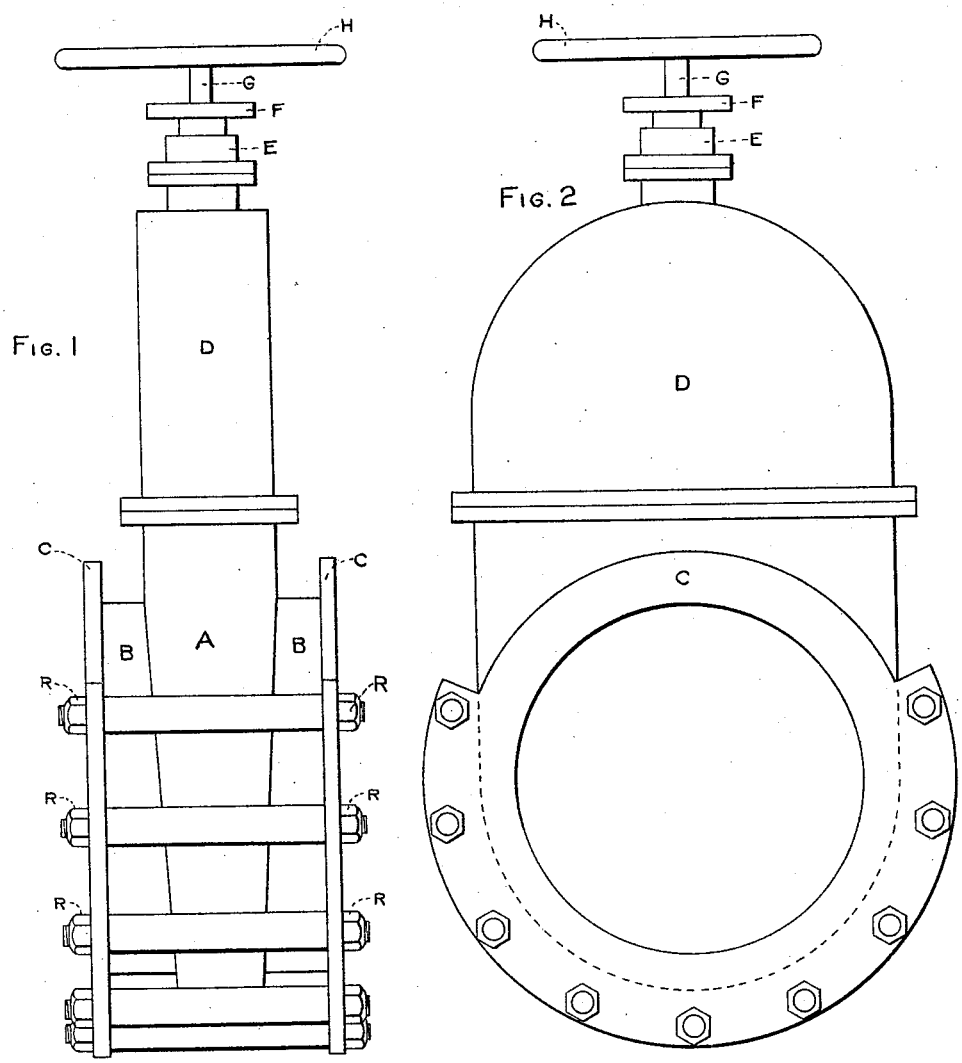

UNITED STATES PATENT OFFICE.

JOHN KNICKERBACKER, OF TROY, NEW YORK.

VALVE.

SPECIFICATION forming part of Letters Patent No. 584,940, dated June 22, 1897.

Application filed December 11, 1896. Serial No. 615,352. (No model.)

*To all whom it may concern:*

Be it known that I, JOHN KNICKERBACKER, a citizen of the United States, residing at Troy, in the county of Rensselaer and State of New York, have invented certain new and useful Improvements in Valves to Stand Temperature Strains; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to construct a gate-valve which may be used in a continuous line of pipe and be free from the expansion and contraction strains set up by the variation in the temperature of the pipe. I attain these objects by the mechanism illustrated by the accompanying drawings, in which—

Figure 1 is an outside elevation of the valve, showing the bolts and columns in position. Fig. 2 is a vertical outside elevation of the valve revolved one hundred and eighty degrees from the position shown by Fig. 1. Fig. 3 is a vertical section of the valve with detachable flanged ends. Fig. 4 is a section showing one of the flanges and a portion of one of the pipe ends of the valve. Fig. 5 is a view of one of the tension-bolts detached. Fig. 6 is a view of one of the compression-columns. Fig. 7 is a section of one of the compression-columns through the plane X Y.

Similar letters refer to similar parts throughout the several views.

The body or casing of the valve A is provided with the pipe ends B B, over the ends of which fit the flanges C C'. The opening through the valve is controlled by the plug L, which is operated by the screw-threaded stem G to open and close the passage-way through the valve. I do not wish to limit myself to the use of a plug, as any form of gate-valve may be used. The valve is provided, as usual, with a cover D, stuffing-box E, follower F, and the hand-wheel H or their equivalents. The flanges C C' are made separate from the pipe ends B B and fit over them. The backs and faces of these flanges are made plain. The flanges are connected together by the through-bolts J, which have on their ends the nuts R. The flanges are held the desired distance apart by the columns K. By this device it will be seen that when the valve is bolted by means of the end flanges in a pipe-line, subject to expansion and contraction due to change in temperature, the flanges held together by means of the through-bolts J J prevent any of the tensile strain due to the contraction of the pipe being put upon the valve-body, and the columns between the flanges take up the compressive strain due to the expansion of the pipe caused by its rising in temperature. The number and sizes of the bolts and the number and sizes of the columns between the flanges are made of sufficient strength to take up the temperature strains.

In large conduit-lines of wrought-iron or steel pipe where the line is made continuous the strains set up in the pipe due to changes in temperature of it are very large. Expansion-joints are used on one or both ends of the valves to prevent these strains acting upon the body of the valve. The use of the expansion-joints is made necessary because the strain on the valve would be apt to distort it, so as to cause it to leak on account of the plug or equivalent device not having a true bearing on the distorted case-seats, against which it would rest when in position.

The device herein described carries around the valve all the strain put upon the pipe by the temperature.

Between the inside of the pipe-flange and the outside of the pipe ends the space may be filled up with lead to prevent leakage between the pipe and the flange, or an accurate fit may be made, as thought advisable.

What I desire to claim as new and of my own invention is—

1. In combination with a valve-case having pipe ends, of separate end flanges connected together by longitudinal through-bolts, substantially as described.

2. In combination with a valve-case having pipe ends, of separate end flanges connected together by through-bolts and separated by columns, substantially as described.

3. In combination with a valve-case having pipe ends, separate end flanges connected together by through-bolts; of packing between the pipe ends and the separate flanges, substantially as described.

In testimony whereof I affix my signature in presence of two witnesses.

JOHN KNICKERBACKER.

Witnesses:
L. R. STROUD,
H. W. MESNARD.